May 12, 1959  R. GUSTAFSSON ET AL  2,886,246
THERMOSTATICALLY REGULATED TEMPERATURE CONTROL SYSTEM
Filed June 13, 1956
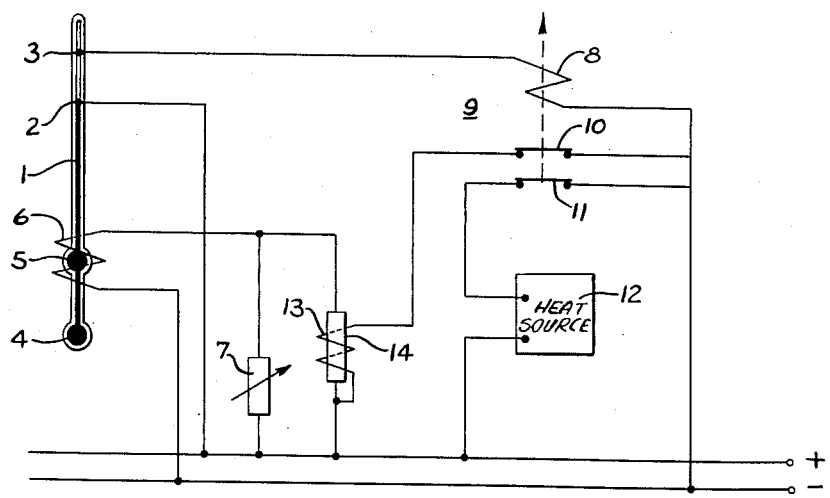
Inventors
RAGNAR GUSTAFSSON
CURT HERMAN GUSTAF PLASS
by: Harvey M. Gillespie
atty.

2,886,246

THERMOSTATICALLY REGULATED TEMPERATURE CONTROL SYSTEM

Ragnar Gustafsson and Curt Herman Gustaf Plass, Lidingoe, Sweden, assignors to Vapor Heating Corporation, Chicago, Ill., a corporation of Delaware Application June 13, 1956, Serial No. 591,109

4 Claims. (Cl. 236—68)

The present invention relates to a control system for thermostatically regulating the temperature of an enclosure, which system contains a temperature responsive member in the form of a contact thermometer, which influences, directly or via relays, the function of a heat source, for example an electrical heater for supplying heat to said enclosure. In such control systems it is already known to provide the contact thermometer, which is preferably a mercury thermometer having contact wires fused into the wall of the thermometer tube, with an auxiliary heating coil, which forms part of a circuit containing an adjustable resistor, so that, through this resistor, the temperature range within which the thermometer operates can be adjusted by adding thereto or distracting therefrom increments of electrical heat.

To prevent overregulation of the control system, caused, among other things, by the thermal inertia of the heat source, it is desirable to supply the heating coil for the thermostat with current flowing through a second resistor in such a way that the additional current through this resistor is fed into the heating coil of the thermostat only during the time intervals when current is being supplied to the heat source. This arrangement has however had the disadvantage that the contact thermometer cycles or switches over at a comparatively rapid rate between the make and break positions, so that the continual opening and closing of the relay contacts creates a disturbing noise in the enclosure whose temperature is regulated by the control system.

These disadvantages are removed by the control system of the present invention, owing to the fact that the duty cycle of the system, comprising recurrent opening and closing of the relay contacts may be made considerably longer and, within certain limits adjustable. In an arrangement of this kind the adjustable resistor is, according to the invention, connected in parallel with a temperature-sensitive resistor, which is influenced by a heating coil controlled by the contact thermometer. The resistor can for instance have a negative temperature coefficient of resistance so that it will have a high resistance when cold, while the resistance decreases considerably when the resistor is heated. The heating coil that influences the resistor having the negative temperature coefficient of resistance preferably forms part of a circuit containing the contacts of the relay, which also controls the electric circuit for the heat source in response to the level of the mercury in the contact thermometer.

The invention will be described below with reference to a particular embodiment illustrated in the accompanying drawing.

The contact thermometer is assumed to be a mercury thermometer 1, in which contacts 2 and 3 are inserted in such a way that the mercury of the thermometer may contact the wires. The thermometer has a lower bulb 4, which is for instance influenced by the temperature of the surrounding air within the enclosure whose temperature is being controlled, and a second bulb 5, which is surrounded by and can be heated by an auxiliary heating coil 6. The heating coil forms part of a circuit connected between the positive and the negative pole of a voltage source and which also comprises an adjustable resistor 7. The mercury column of the thermometer is assumed normally to be in contact with the contact wire 2 and can upon an increase in temperature above a certain level, also come into contact with the other contact wire 3. The mercury column between the contact wires then closes a circuit containing the winding 8 of a relay 9. This relay is provided with a pair of break contacts, which are closed as long as the relay is not energized and break upon energization of the relay. Both relay contacts are shown herein as being closed when the relay coil is deenergized consequently the contact 11 closes an energizing circuit for the heat source 12 and this source remains in operation as long as the relay 9 is deenergized. In series with the other relay contact 10 is a heating winding 13, which influences the temperature-sensitive resistor 14. This resistor has a negative temperature coefficient of resistance and is connected in parallel with the adjustable resistor 7, so that the current through the heating winding 6 is composed of components from both resistors.

When the arrangement is in the state shown in the drawing, in which no current flows through the relay winding 8, the circuit through the heating winding 13 is closed, whereby the resistance of the temperature-sensitive resistor 14 is held at a low value. Owing to the current components flowing through the resistors 7 and 14 to the heating winding 6, the mercury in the thermometer 1 is heated. At the same time current is supplied to the heat source 12 through the relay contact 11, so that the temperature rises in the enclosure in which the thermometer 1 is located. Under the simultaneous influence of the heating winding 6 and the air in the enclosure in which the thermometer 1 is placed the mercury column rises in the thermometer, so that connection is obtained between the contact wires 2 and 3. This causes current to flow to the relay winding 8, so that the relay contacts 10 and 11 open their associated circuits. As a consequence, the heating winding 13 cools down, making the resistor 14 take a high value of resistance again. Furthermore, the supply of energy to the heat source is cut off. The heat source then cools down, which occurs rather slowly, however, owing to its thermal inertia. Because the resistance of the resistor 14 increases when the resistor cools, less current is supplied to the heating winding 6, which causes the mercury column of the thermometer 1 to recede, so that the circuit is again broken after a while between the contact wires 2 and 3. The relay winding 8 is thus deenergized again, and the relay contacts 10 and 11 are closed, whereupon the same operating cycle is repeated. In this way the relay 9 will keep making and breaking the contacts 10 and 11 periodically, so that an even temperature is maintained in the room containing the thermometer 1. The length of the intervals during which the contacts 10 and 11 are closed or broken respectively is determined by the temperature coefficient of the resistor 14, by the heat transmission from the heating coil 13 to the resistor 14 and also by the cooling of the resistor 14.

In the embodiment chosen to illustrate the present invention, the resistor 14 is assumed to have such a characteristic that the resistance decreases with a rise in temperature and therefore increases the flow of current to the heat winding 6. However it is obvious that the resistor 14 can also have a contrary characteristic, whereby its resistance is reduced to increase the flow of heating current to the heat winding 6 by reducing the temperature of the said resistance 14 of contrary characteristic.

In such case the movable contact 10 of the relay 9 should be arranged to close and thereby direct heating current to the winding 13 when the furnace is de-energized and whereby the closing of contact 11 to energize the furnace results in opening the contact 10 and its associated circuit to permit cooling of the resistor 14 and thereby reduce its resistance and consequently proportionately increase the flow of current to the heater 6.

In the arrangement illustrated herein the temperature-sensitive resistor 14 has a high but still finite value of resistance when cold. A substantial variation in resistance can be achieved if the resistor is connected in circuit, for instance through the movable contact 10 of the relay 9, only when current flows to the heating winding 13 and to the heat source 12, whereas it is disconnected when the current to the heating winding 13 and to the heat source 12 is broken. When the resistor is thus disconnected upon energization of the relay 9, interrupting the current at the movable contacts, there is a sudden decrease in the current supplied to the heating winding 6. At the same time the resistor 14 cools, so that it has resumed a high value of resistance, in time for a subsequent insertion thereof in the circuit.

What we claim is:

1. A thermostatically regulated temperature control system comprising a contact thermometer located in an enclosure whose temperature is being controlled, an electric heater for applying heat to the thermometer, an electrical circuit including an adjustable resistor for supplying current of fixed heating value to said electric heater, a second circuit for supplying electric current to said heater, a temperature sensitive resistor interposed in said second circuit, an auxiliary heater for varying the resistance of said temperature sensitive resistor and thereby varying the effectiveness of said electric heater associated with said contact thermometer, an electrically energizable heat source for the enclosure whose temperature is being controlled, and an electrical means responsive to the functioning of said contact thermometer for energizing said auxiliary heater and for controlling the effectiveness of said enclosure heat source.

2. A thermostatically regulated temperature control system as defined in claim 1, characterized in that said electric means includes a movable contact of a relay having an actuating magnet connected in an electric circuit connected through said contact thermometer.

3. A thermostatically regulated temperature control system according to claim 2, characterized in that the temperature-sensitive resistor is connected in parallel with the adjustable resistor.

4. A thermostatically regulated temperature control system according to claim 3, characterized in that the temperature-sensitive resistor has such a temperature characteristic that its resistance decreases with rising temperature.

References Cited in the file of this patent
UNITED STATES PATENTS

| | | |
|---|---|---|
| 2,156,082 | Crago | Apr. 25, 1939 |
| 2,249,215 | Lange | July 15, 1941 |
| 2,295,340 | Fiene | Sept. 8, 1942 |
| 2,394,708 | Masek | Feb. 12, 1946 |
| 2,471,457 | Shepard | May 31, 1949 |